(12) United States Patent
Rueger et al.

(10) Patent No.: US 6,982,516 B2
(45) Date of Patent: Jan. 3, 2006

(54) COMPENSATION OF BATCH VARIATION IN THE TRAVEL DUE TO VARIATIONS IN THE LAYER THICKNESS OR NUMBER OF LAYERS IN MULTI-LAYER PIEZOELECTRIC ELEMENTS

(75) Inventors: Johannes-Jörg Rueger, Vaihingen/enz (DE); Wolfgang Stoecklein, Stuttgart (DE); Bertram Sugg, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 240 days.

(21) Appl. No.: 09/824,193

(22) Filed: Apr. 2, 2001

(65) Prior Publication Data
US 2001/0050512 A1    Dec. 13, 2001

(30) Foreign Application Priority Data
Apr. 1, 2000 (EP) ................... 00106990

(51) Int. Cl.
*H01L 41/08* (2006.01)
(52) U.S. Cl. .............. 310/316.01; 310/316.03
(58) Field of Classification Search ............ 310/317, 310/316.01, 316.07, 328
See application file for complete search history.

(56) References Cited

U.S. PATENT DOCUMENTS

| | | | | |
|---|---|---|---|---|
| 4,384,230 A | * | 5/1983 | Wisner | 310/317 |
| 4,593,658 A | * | 6/1986 | Moloney | 123/90.11 |
| 4,689,514 A | * | 8/1987 | Kondoh et al. | 310/316.03 |
| 5,053,668 A | * | 10/1991 | Mitsuyasu | 310/317 |
| 5,384,507 A | * | 1/1995 | Takada et al. | 310/317 |
| 5,479,062 A | * | 12/1995 | Yoshino | 310/316.01 |
| 5,575,264 A | * | 11/1996 | Barron | 123/486 |
| 5,969,464 A | * | 10/1999 | Nakano et al. | 310/328 |
| 6,121,715 A | * | 9/2000 | Hoffmann et al. | 310/316.03 |
| 6,157,174 A | * | 12/2000 | Hoffmann et al. | 320/166 |
| 6,247,451 B1 | * | 6/2001 | Estevenon et al. | 123/456 |
| 6,340,858 B1 | * | 1/2002 | Jaenker | 310/328 |

FOREIGN PATENT DOCUMENTS

| | | |
|---|---|---|
| DE | 197 29 844 | 1/1999 |
| DE | 197 33 560 | 2/1999 |
| DE | 197 42 073 | 3/1999 |
| DE | 198 05 184 | 8/1999 |
| EP | 0 371 469 | 6/1990 |
| EP | 0 379 182 | 7/1990 |
| FR | 2783980 | 3/2000 |
| JP | 07 107 753 | 4/1995 |
| JP | 63 167 684 | 7/1998 |
| WO | WO 97/20136 | 6/1997 |

* cited by examiner

*Primary Examiner*—Mark Budd
(74) *Attorney, Agent, or Firm*—Kenyon & Kenyon

(57) ABSTRACT

The invention describes a method and an apparatus for charging a piezoelectric element, for example, used as an actuator in a fuel injection system of an internal combustion engine. The method and apparatus are characterized in that the piezoelectric element is activated by an activation voltage having a value set as a function of manufacturing characteristics of the particular piezoelectric element and based upon, for example, a correction value for injected fuel volume.

33 Claims, 7 Drawing Sheets

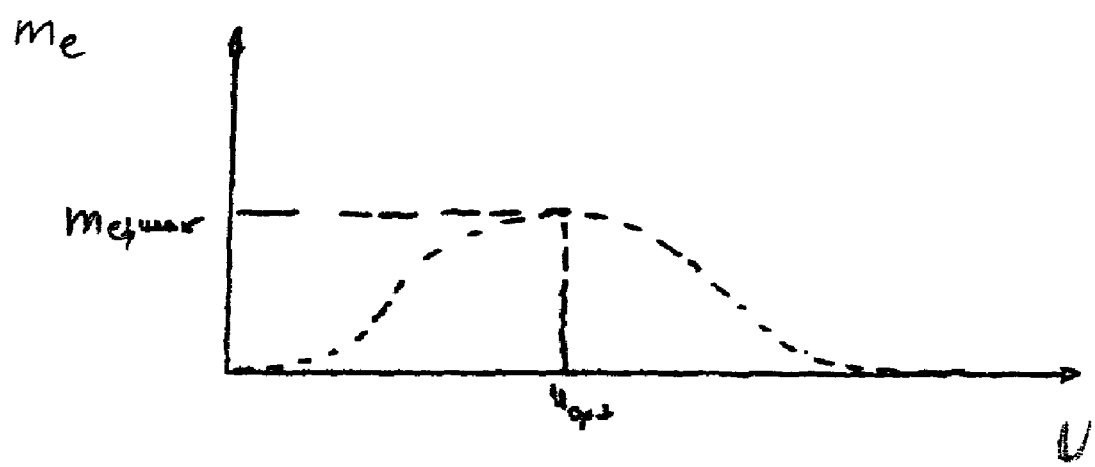

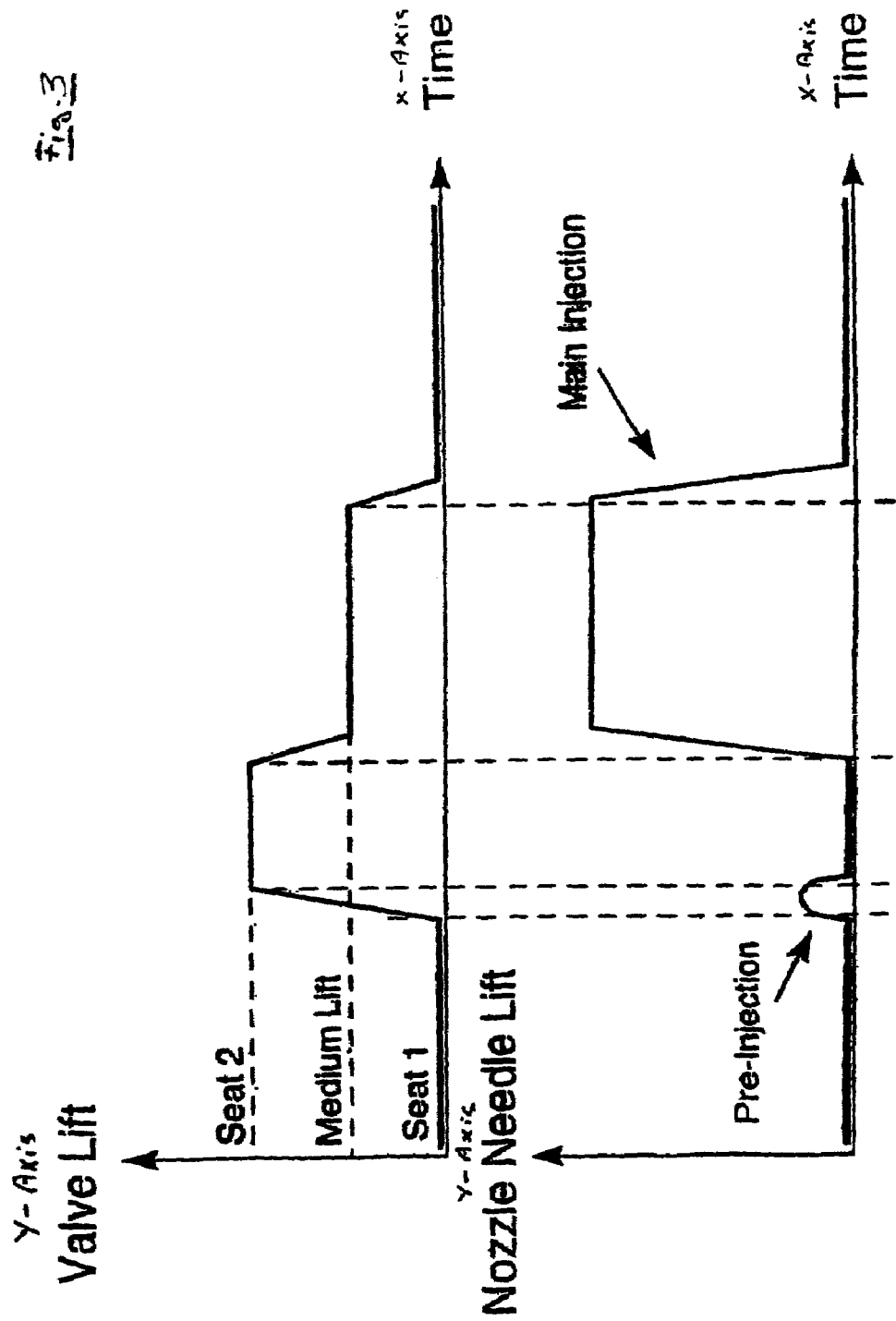

COMPENSATION OF BATCH VARIATION IN THE TRAVEL DUE TO VARIATIONS IN THE LAYER THICKNESS OR NUMBER OF LAYERS IN MULTI-LAYER PIEZOELECTRIC ELEMENTS

The present invention relates to an apparatus as defined in the preamble of claim 1, and a method as defined in the preamble of claim 8, i.e., an apparatus and a method for charging a piezoelectric element while compensating for manufacturing variation in the piezoelectric elements.

The present piezoelectric elements being considered in more detail are, in particular but not exclusively, piezoelectric elements used as actuators. Piezoelectric elements can be used for such purposes because they possess the property of contracting or expanding as a function of a voltage applied thereto or occurring therein.

Fuel injection systems using piezoelectric actuators are characterized by the fact that, to a first approximation, piezoelectric actuators exhibit a proportional relationship between applied voltage and the linear expansion.

The practical implementation of actuators using piezoelectric elements proves to be advantageous in particular if the actuator in question must perform rapid and/or frequent movements, such as those used in fuel injection nozzles for internal combustion engines. Reference is made, for example, to EP 0 371 469 B1 and to EP 0 379 182 B1 regarding the usability of piezoelectric elements in fuel injection nozzles.

In the example of a fuel injection nozzle, expansion and contraction of piezoelectric elements are used to control valves that manipulate the linear strokes of injection needles. German patent applications DE 197 42 073 A1 and DE 197 29 844 A1 disclose piezoelectric elements with double acting, double seat valves for controlling injection needles in a fuel injection system and are incorporated herein by reference in their entirety.

In a fuel injection nozzle, for example, implemented as a double acting, double seat valve to control the linear stroke of a needle for fuel injection into a cylinder of an internal combustion engine, the amount of fuel injected into a corresponding cylinder is a function of the time the valve is open, and in the case of the use of a piezoelectric element, the activation voltage applied to the piezoelectric element.

FIG. 1 is a schematic representation of a fuel injection system using a piezoelectric element 2010 as an actuator. Referring to FIG. 1, the piezoelectric element 2010 is electrically energized to expand and contract in response to a given activation voltage. The piezoelectric element 2010 is coupled to a piston 2015. In the expanded state, the piezoelectric element 2010 causes the piston 2015 to protrude into a hydraulic adapter 2020 which contains a hydraulic fluid, for example fuel. As a result of the piezoelectric element's expansion, a double acting control valve 2025 is hydraulically pushed away from hydraulic adapter 2020 and the valve plug 2035 is extended away from a first closed position 2040. The combination of double acting control valve 2025 and hollow bore 2050 is often referred to as double acting, double seat valve for the reason that when piezoelectric element 2010 is in an unexcited state, the double acting control valve 2025 rests in its first closed position 2040. On the other hand, when the piezoelectric element 2010 is fully extended, it rests in its second closed position 2030. The later position of valve plug 2035 is schematically represented with ghost lines in FIG. 1.

The fuel injection system comprises an injection needle 2070 allowing for injection of fuel from a pressurized fuel supply line 2060 into the cylinder (not shown). When the piezoelectric element 2010 is unexcited or when it is fully extended, the double acting control valve 2025 rests respectively in its first closed position 2040 or in its second closed position 2030. In either case, the hydraulic rail pressure maintains injection needle 2070 at a closed position. Thus, the fuel mixture does not enter into the cylinder (not shown). Conversely, when the piezoelectric element 2010 is excited such that double acting control valve 2025 is in the so-called mid-position with respect to the hollow bore 2050, then there is a pressure drop in the pressurized fuel supply line 2060. This pressure drop results in a pressure differential in the pressurized fuel supply line 2060 between the top and the bottom of the injection needle 2070 so that the injection needle 2070 is lifted allowing for fuel injection into the cylinder (not shown).

In any fuel injection system, the ultimate goal is to achieve a desired fuel injection volume with high accuracy, especially at small injection volumes, for example during pilot injection. In the example of a double acting control valve, it has proven to be difficult to determine and apply an activation voltage suitable for all injection elements and the whole lifetime of the injection system with sufficient precision such that, for example, a corresponding valve plug is accurately positioned for maximum fuel flow.

It was previously assumed that the relationship between the piezoelectric travel and its voltage could be established with good accuracy and reproducibility by means of a characteristic curve that was determined for all actuators of the same structural design. However, it has been found that through repeated use piezoelectric elements show symptoms of aging. These symptoms manifests themselves in changes to piezoelectric element's maximum travel and its capacitance. Under certain circumstances, these aging symptoms can have a very disruptive effect in operation of the entire injector or the pump element.

Moreover, variations in the layer thickness or the number of layers affect the maximum piezoelectric travel for voltage control or charge control. German patent application DE 197 33 560 proposed measuring changes of the piezoelectric capacitance over the charging or discharging time with a specified current cure and thereby deriving the aging of the actuator. Manufacturing tolerances that exist from the outset, however, cannot be eliminated in this way.

It is therefore an object of the present invention to develop the apparatus as defined in the preamble of claim 1 and the method as defined in the preamble of claim 8 in such a way as to compensate, on an approximate basis, for manufacturing variation in piezoelectric elements, thereby ensuring proper operation of the injectors or pump element containing piezoelectric elements.

This object is achieved, according to the present invention, by way of the features claimed in the characterizing portion of claim 1 (apparatus) and in the characterizing portion of claim 8 (method).

These provide for:

an activation voltage value for charging the piezoelectric element is controlled online by a compensation unit which adjusts the activation voltage and activation charge in order to compensate for deviations caused by variations in the piezoelectric element's layer thickness or the number of layers (characterizing portion of claim 1); and for a definition to be made, prior to charging, as to a value for an activation voltage and an activation charge of the piezoelectric element, as a function of batch variation in the travel of the piezoelectric element (characterizing portion of claim 8).

As such, this invention provides means to compensate for batch variation in the piezoelectric element's travel due to variations in the layer thickness, or the number of layers (in the case of multi-layer piezoelectric elements) to thereby achieve a higher degree of accuracy in the piezoelectric element's travel.

One advantage of the invention is that manufacturing tolerances such as those that are inevitable in the fabrication of piezoelectric actuators can be compensated to ensure a more accurate functioning of the actuator. Another advantage of the claimed invention is that secondary condition, such as overall length, is not required. Yet another advantage of the present invention is that it provides an alternative means for compensating the piezoelectric travel without having to measure the capacitance of the component.

Other advantages of the present invention are evident from the dependent claims, the description below, and the figures.

The invention will be explained below in more detail with reference to exemplary embodiments, referring to the figures in which:

FIG. 1 schematically represents an embodiment of a fuel injection system using a piezoelectric element as an actuator;

FIG. 2 shows a graph depicting the relationship between activation voltage and injected fuel volume in a fixed time period for the example of a double acting control valve;

FIG. 3 shows a schematic profile of an exemplary control valve stroke and a corresponding nozzle needle lift for the example of a double acting control valve;

Figure 7:
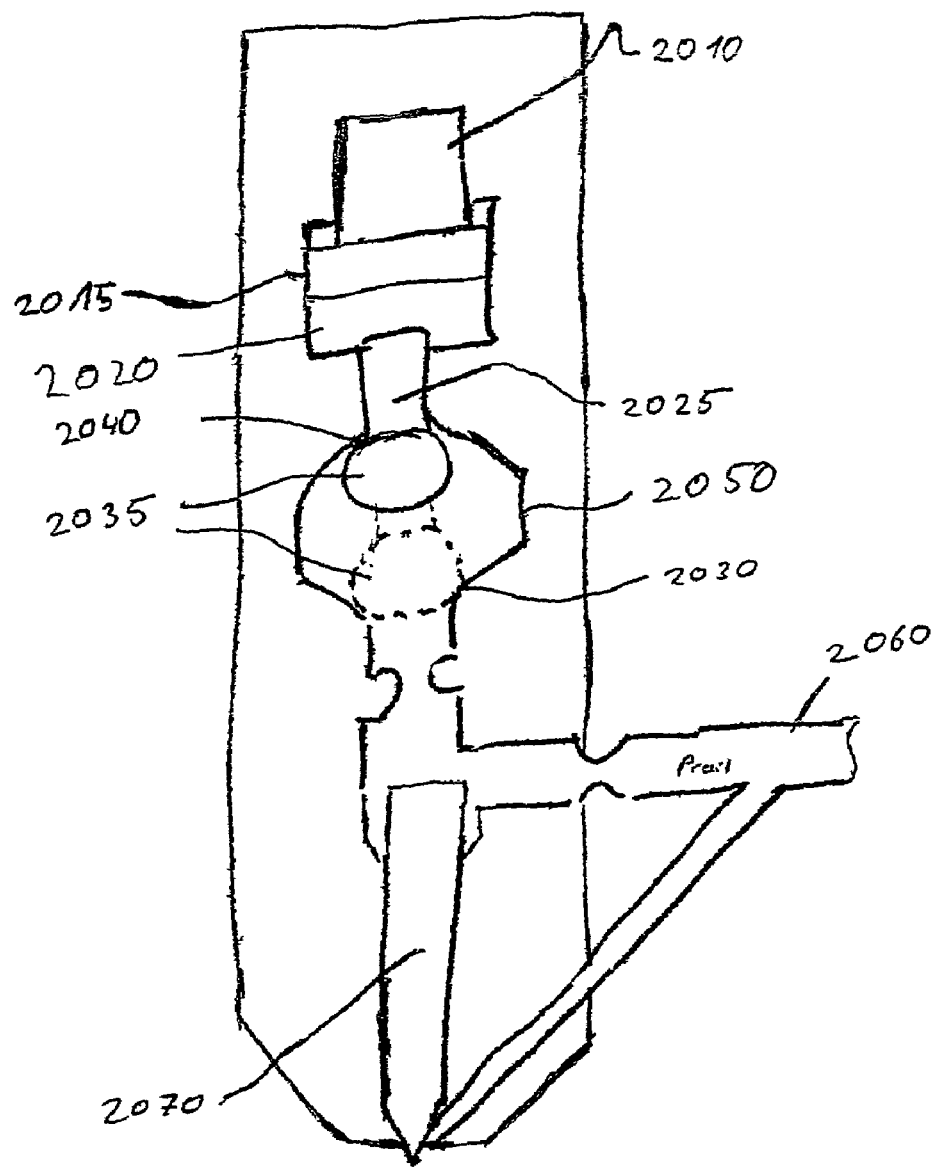
FIG. 7 schematically represents one configuration for controlling a combustion engine.

FIG. 2 shows a graph depicting the relationship between activation voltage U and injected fuel volume $m_e$ during a preselected fixed time period, for an exemplary fuel injection system using piezoelectric elements acting upon double acting control valves. The y-axis represents volume of fuel injected into a cylinder chamber during the preselected fixed period of time. The x-axis represents the activation voltage applied to or stored in the corresponding piezoelectric element, used to displace a valve plug of the double acting control valve.

At x=0, y=0, the activation voltage U is zero, and the valve plug is seated in a first closed position to prevent the flow of fuel during the preselected fixed period of time. For values of the activation voltage U greater than zero, up to the x-axis point indicated as $U_{opt}$, the represented values of the activation voltage U cause the displacement of the valve plug away from the first closed position and towards the second closed position, in a manner that results in a greater volume of injected fuel for the fixed time period, as the activation voltage approaches $U_{opt}$, up to the value for volume indicated on the y-axis by $m_{e,max}$. The point $m_{e,max}$, corresponding to the greatest volume for the injected fuel during the fixed period of time, represents the value of the activation voltage for application to or charging of the piezoelectric element, that results in an optimal displacement of the valve plug between the first and second closed position (respectively represented in FIG. 1, as 2040 and 2030).

As shown on the graph of FIG. 2, for values of the activation voltage greater than $U_{opt}$, the volume of fuel injected during the fixed period of time decreases until it reaches zero. This represents displacement of the valve plug from the optimal point and toward the second closed position of the double acting control valve until the valve plug is seated against the second valve closed position. Thus, the graph of FIG. 2 illustrates that a maximum volume of fuel injection occurs when the activation voltage causes the piezoelectric element to displace the valve plug to the optimal point.

The present invention teaches that the value for $U_{opt}$ at any given time for a particular piezoelectric element is influenced by the manufacturing characteristics of the particular piezoelectric element at that time and the aging symptoms that may be affecting the individual piezoelectric element. That is, the amount of displacement caused by the piezoelectric element for a certain activation voltage varies as a function of the operating characteristics (manufacturing characteristics and aging effects) of the particular piezoelectric element. Accordingly, in order to achieve a maximum volume of fuel injection, $m_{e,max}$, during a given fixed period of time, the activation voltage applied to or occurring in the piezoelectric element should be set to a value relevant to current operating characteristics of the particular piezoelectric element, to achieve $U_{opt}$.

FIG. 3 shows a double graph representing a schematic profile of an exemplary control valve stroke, to illustrate the double control valve operation discussed above. In the upper graph of FIG. 3, the x-axis represents time, and the y-axis represents displacement of the valve plug (valve lift). In the lower graph of FIG. 3, the x-axis once again represents time, while the y-axis represents an injection nozzle needle lift to provide fuel flow, resulting from the valve lift of the upper graph. The upper and lower graphs are aligned with one another to coincide in time, as represented by the respective x-axises.

During an injection cycle, the piezoelectric element is charged resulting in an expansion of the piezoelectric element, as will be described in greater detail, and causing the corresponding valve plug to move from the first closed position to the second closed position for a pre-injection stroke, as shown in the upper graph of FIG. 3. The lower graph of FIG. 3 shows a small injection of fuel that occurs as the valve plug moves between the two seats of the double acting control valve, opening and closing the valve as the plug moves between the seats. In general, the charging of the piezoelectric element can be done in two steps: the first one is to charge it to a certain voltage and cause the valve to open and the second one is to charge it further and cause the valve to close again at the second seat. Between these steps, in general, there can be a certain time delay.

After a preselected period of time, a discharging operation is then performed, as will be explained in greater detail below, to reduce the charge within the piezoelectric element so that it contracts, as will also be described in greater detail, causing the valve plug to move away from the second seat, and hold at a midway point between the two seats. As indicated in FIG. 2, the activation voltage within the piezoelectric element is to reach a value that equals $U_{opt}$ to correspond to an optimal point of the valve lift, and thereby obtain a maximum fuel flow, $m_{e,max}$, during the period of time allocated to a main injection. The upper and lower graphs of FIG. 3 show the holding of the valve lift at a midway point, resulting in a main fuel injection.

At the end of the period of time for the main injection, the piezoelectric element is discharged to an activation voltage of zero, resulting in further contraction of the piezoelectric element, to cause the valve plug to move away from the optimal position, towards the first seat, closing the valve and stopping fuel flow, as shown in the upper and lower graphs of FIG. 3. At this time, the valve plug will once again be in a position to repeat another pre-injection, main injection cycle, as just described above, for example. Of course, the diagram of FIG. 3 represents only one embodiment of the invention and it would be obvious to an ordinary skilled artisan that any other injection cycle can be performed.

Figure 4:
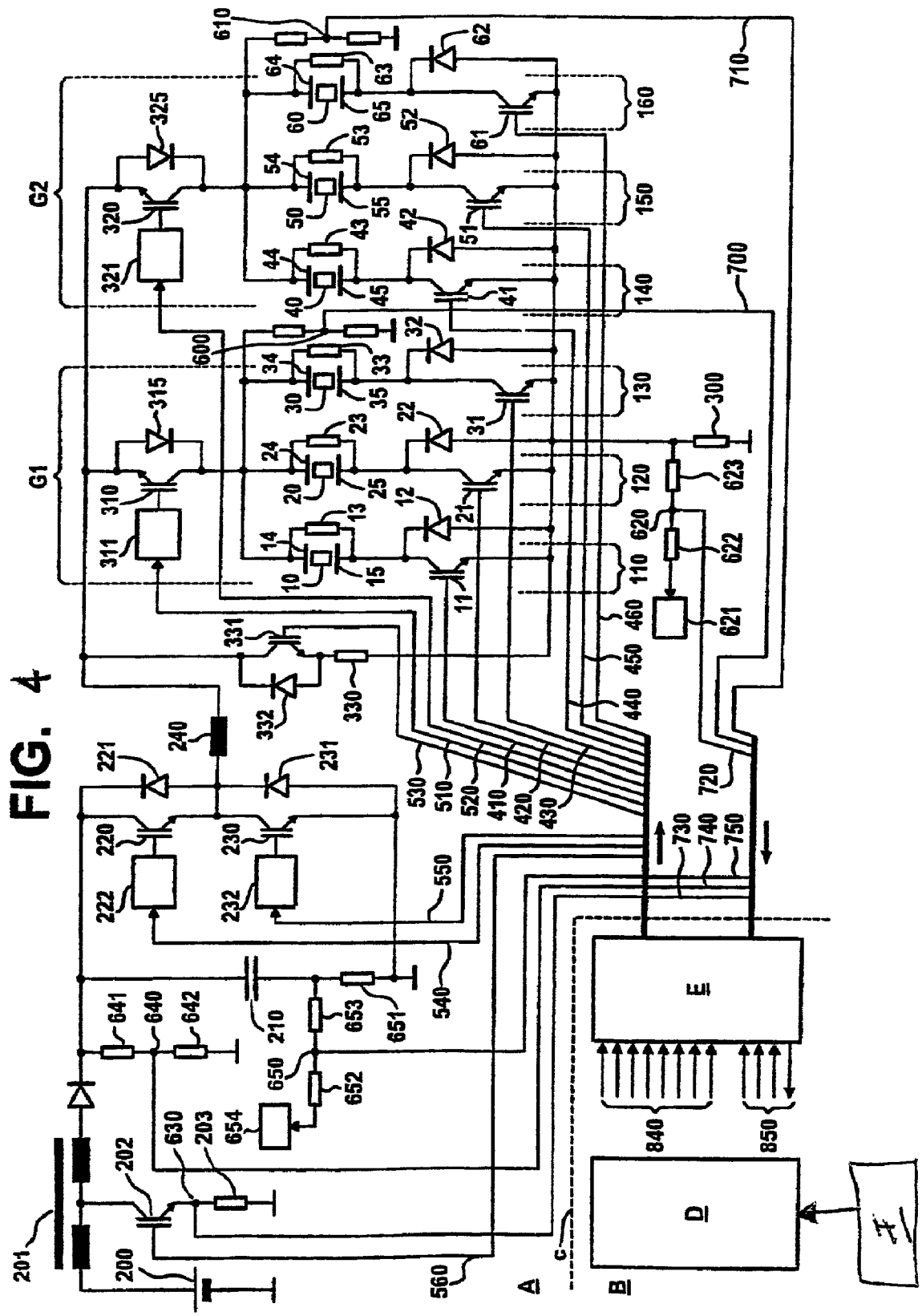
FIG. 4 shows a block diagram of an exemplary embodiment of an arrangement in which the present invention may be implemented.

FIG. 4 provides a block diagram of an exemplary embodiment of an arrangement in which the present invention may be implemented.

In FIG. 4 there is a detailed area A and a non-detailed area B, the separation of which is indicated by a dashed line c. The detailed area A comprises a circuit for charging and discharging piezoelectric elements 10, 20, 30, 40, 50 and 60. In the example being considered these piezoelectric elements 10, 20, 30, 40, 50 and 60 are actuators in fuel injection nozzles (in particular in so-called common rail injectors) of an internal combustion engine. Piezoelectric elements can be used for such purposes because, as is known, and as discussed above, they possess the property of contracting or expanding as a function of a voltage applied thereto or occurring therein. The reason to take six piezoelectric elements 10, 20, 30, 40, 50 and 60 in the embodiment described is to independently control six cylinders within a combustion engine; hence, any other number of piezoelectric elements might match any other purpose.

The non-detailed area B comprises a control unit D and a activation IC E by both of which the elements within the detailed area A are controlled, as well as a measuring system F for measuring system operating characteristics such as, for example, fuel pressure and rotational speed (rpm) of the internal combustion engine for input to and use by the control unit D, according to the present invention, as will be described in detail below. According to the present invention, the control unit D and activation IC E are programmed to control activation voltages for piezoelectric elements as a function of operating characteristics of the each particular piezoelectric element.

The following description firstly introduces the individual elements within the detailed area A. Then, the procedures of charging and discharging piezoelectric elements 10, 20, 30, 40, 50, 60 are described in general. Finally, the ways both procedures are controlled by means of control unit D and activation IC E, according to the present invention, are described in detail.

The circuit within the detailed area A comprises six piezoelectric elements 10, 20, 30, 40, 50 and 60.

The piezoelectric elements 10, 20, 30, 40, 50 and 60 are distributed into a first group G1 and a second group G2, each comprising three piezoelectric elements (i.e. piezoelectric elements 10, 20 and 30 in the first group G1 resp. 40, 50 and 60 in the second group G2). Groups G1 and G2 are constituents of circuit parts connected in parallel with one another. Group selector switches 310, 320 can be used to establish which of the groups G1, G2 of piezoelectric elements 10, 20 and 30 resp. 40, 50 and 60 will be discharged in each case by a common charging and discharging apparatus (however, the group selector switches 310, 320 are meaningless for charging procedures, as is explained in further detail below).

The group selector switches 310, 320 are arranged between a coil 240 and the respective groups G1 and G2 (the coil-side terminals thereof) and are implemented as transistors. Side drivers 311, 321 are implemented which transform control signals received from the activation IC E into voltages which are eligible for closing and opening the switches as required.

Diodes 315 and 325 (referred to as group selector diodes), respectively, are provided in parallel with the group selector switches 310, 320. If the group selector switches 310, 320 are implemented as MOSFETs or IGBTs, these group selector diodes 315 and 325 can be constituted by the parasitic diodes themselves. The diodes 315, 325 bypass the group selector switches 310, 320 during charging procedures. Hence, the functionality of the group selector switches 310, 320 is reduced to select a group G1, G2 of piezoelectric elements 10, 20 and 30, resp. 40, 50 and 60 for a discharging procedure only.

Within each group G1 resp. G2 the piezoelectric elements 10, 20 and 30, resp. 40, 50 and 60 are arranged as constituents of piezoelectric branches 110, 120 and 130 (group G1) and 140, 150 and 160 (group G2) that are connected in parallel. Each piezoelectric branch comprises a series circuit made up of a first parallel circuit comprising a piezoelectric element 10, 20, 30, 40, 50 resp. 60 and a resistor 13, 23, 33, 43, 53 resp. 63 (referred to as branch resistors) and a second parallel circuit made up of a selector switch implemented as a transistor 11, 21, 31, 41, 51 resp. 61 (referred to as branch selector switches) and a diode 12, 22, 32, 42, 52 resp. 62 (referred to as branch diodes).

The branch resistors 13, 23, 33, 43, 53 resp. 63 cause each corresponding piezoelectric element 10, 20, 30, 40, 50 resp. 60 during and after a charging procedure to continuously discharge themselves, since they connect both terminals of each capacitive piezoelectric element 10, 20, 30, 40, 50, resp. 60 one to another. However, the branch resistors 13, 23, 33, 43, 53 resp. 63 are sufficiently large to make this procedure slow compared to the controlled charging and discharging procedures as described below. Hence, it is still a reasonable assumption to consider the charge of any piezoelectric element 10, 20, 30, 40, 50 or 60 as unchanging within a relevant time after a charging procedure (the reason to nevertheless implement the branch resistors 13, 23, 33, 43, 53 and 63 is to avoid remaining charges on the piezoelectric elements 10, 20, 30, 40, 50 and 60 in case of a breakdown of the system or other exceptional situations). Hence, the branch resistors 13, 23, 33, 43, 53 and 63 may be neglected in the following description.

The branch selector switch/branch diode pairs in the individual piezoelectric branches 110, 120, 130, 140, 150 resp. 160, i.e. selector switch 11 and diode 12 in piezoelectric branch 110, selector switch 21 and diode 22 in piezoelectric branch 120, and so on, can be implemented using electronic switches (i.e. transistors) with parasitic diodes, for example MOSFETs or IGBTs (as stated above for the group selector switch/diode pairs 310 and 315 resp. 320 and 325).

The branch selector switches 11, 21, 31, 41, 51 resp. 61 can be used to establish which of the piezoelectric elements 10, 20, 30, 40, 50 or 60 will be charged in each case by a common charging and discharging apparatus: in each case, the piezoelectric elements 10, 20, 30, 40, 50 or 60 that are charged are all those whose branch selector switches 11, 21, 31, 41, 51 or 61 are closed during the charging procedure which is described below. Usually, at any time only one of the branch selector switches is closed.

The branch diodes 12, 22, 32, 42, 52 and 62 serve for bypassing the branch selector switches 11, 21, 31, 41, 51 resp. 61 during discharging procedures. Hence, in the example considered for charging procedures any individual piezoelectric element can be selected, whereas for discharging procedures either the first group G1 or the second group G2 of piezoelectric elements 10, 20 and 30 resp. 40, 50 and 60 or both have to be selected.

Returning to the piezoelectric elements 10, 20, 30, 40, 50 and 60 themselves, the branch selector piezoelectric terminals 15, 25, 35, 45, 55 resp. 65 may be connected to ground either through the branch selector switches 11, 21, 31, 41, 51 resp. 61 or through the corresponding diodes 12, 22, 32, 42, 52 resp. 62 and in both cases additionally through resistor 300.

The purpose of resistor 300 is to measure the currents that flow during charging and discharging of the piezoelectric elements 10, 20, 30, 40, 50 and 60 between the branch selector piezoelectric terminals 15, 25, 35, 45, 55 resp. 65 and the ground. A knowledge of these currents allows a controlled charging and discharging of the piezoelectric elements 10, 20, 30, 40, 50 and 60. In particular, by closing and opening charging switch 220 and discharging switch 230 in a manner dependent on the magnitude of the currents, it is possible to set the charging current and discharging current to predefined average values and/or to keep them from exceeding or falling below predefined maximum and/or minimum values as is explained in further detail below.

In the example considered, the measurement itself further requires a voltage source 621 which supplies a voltage of 5 V DC, for example, and a voltage divider implemented as two resistors 622 and 623. This is in order to prevent the activation IC E (by which the measurements are performed) from negative voltages which might otherwise occur on measuring point 620 and which cannot be handled be means of activation IC E: such negative voltages are changed into positive voltages by means of addition with a positive voltage setup which is supplied by said voltage source 621 and voltage divider resistors 622 and 623.

The other terminal of each piezoelectric element 10, 20, 30, 40, 50 and 60, i.e. the group selector piezoelectric terminal 14, 24, 34, 44, 54 resp. 64, may be connected to the plus pole of a voltage source via the group selector switch 310 resp. 320 or via the group selector diode 315 resp. 325 as well as via a coil 240 and a parallel circuit made up of a charging switch 220 and a charging diode 221, and alternatively or additionally connected to ground via the group selector switch 310 resp. 320 or via diode 315 resp. 325 as well as via the coil 240 and a parallel circuit made up of a discharging switch 230 or a discharging diode 231. Charging switch 220 and discharging switch 230 are implemented as transistors, for example, which are controlled via side drivers 222 resp. 232.

The voltage source comprises an element having capacitive properties which, in the example being considered, is the (buffer) capacitor 210. Capacitor 210 is charged by a battery 200 (for example a motor vehicle battery) and a DC voltage converter 201 downstream therefrom. DC voltage converter 201 converts the battery voltage (for example, 12 V) into substantially any other DC voltage (for example 250 V), and charges capacitor 210 to that voltage. DC voltage converter 201 is controlled by means of transistor switch 202 and resistor 203 which is utilized for current measurements taken from a measuring point 630.

For cross check purposes, a further current measurement at a measuring point 650 is allowed by activation IC E as well as by resistors 651, 652 and 653 and a 5 V DC voltage, for example, source 654; moreover, a voltage measurement at a measuring point 640 is allowed by activation IC E as well as by voltage dividing resistors 641 and 642.

Finally, a resistor 330 (referred to as total discharging resistor), a stop switch implemented as a transistor 331 (referred to as stop switch), and a diode 332 (referred to as total discharging diode) serve to discharge the piezoelectric elements 10, 20, 30, 40, 50 and 60 (if they happen to be not discharged by the "normal" discharging operation as described further below). Stop switch 331 is preferably closed after "normal" discharging procedures (cycled discharging via discharge switch 230). It thereby connects piezoelectric elements 10, 20, 30, 40, 50 and 60 to ground through resistors 330 and 300, and thus removes any residual charges that might remain in piezoelectric elements 10, 20, 30, 40, 50 and 60. The total discharging diode 332 prevents negative voltages from occurring at the piezoelectric elements 10, 20, 30, 40, 50 and 60, which might in some circumstances be damaged thereby.

Charging and discharging of all the piezoelectric elements 10, 20, 30, 40, 50 and 60 or any particular one is accomplished by way of a single charging and discharging apparatus (common to all the groups and their piezoelectric elements). In the example being considered, the common charging and discharging apparatus comprises battery 200, DC voltage converter 201, capacitor 210, charging switch 220 and discharging switch 230, charging diode 221 and discharging diode 231 and coil 240.

The charging and discharging of each piezoelectric element works the same way and is explained in the following while referring to the first piezoelectric element 10 only.

Figure 5A:
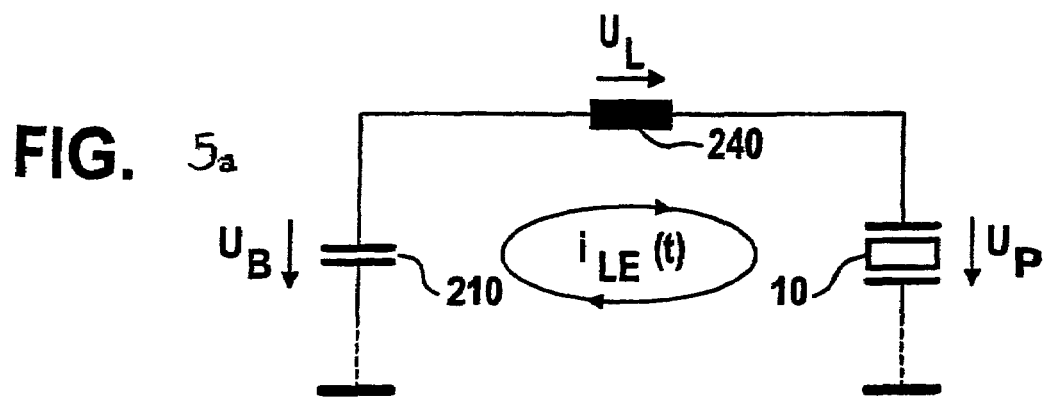
FIG. 5a shows a depiction to explain the conditions occurring during a first charging phase (charging switch 220 closed) in the circuit of FIG. 4.
Figure 5B:
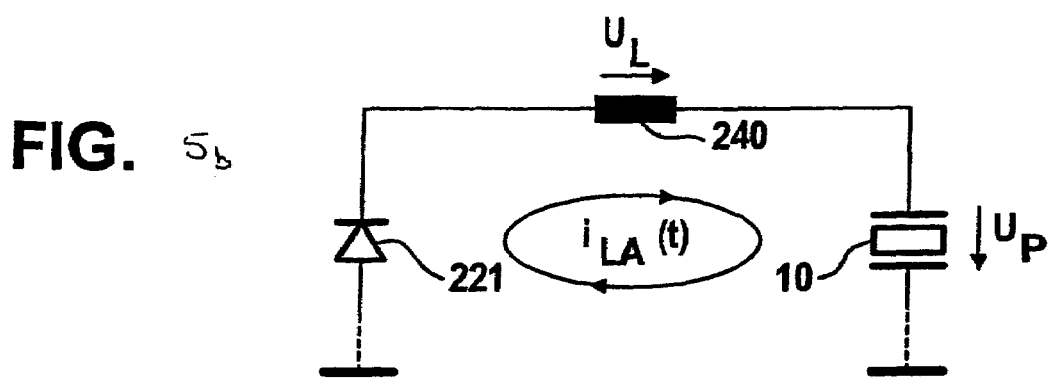
FIG. 5b shows a depiction to explain the conditions occurring during a second charging phase (charging switch 220 open again) in the circuit of FIG. 4.

The conditions occurring during the charging and discharging procedures are explained with reference to FIGS. 5a through 5d, of which FIGS. 5a and 5b illustrate the charging of piezoelectric element 10, and FIGS. 5c and 5d the discharging of piezoelectric element 10.

The selection of one or more particular piezoelectric elements 10, 20, 30, 40, 50 or 60 to be charged or discharged, the charging procedure as described in the following as well as the discharging procedure are driven by activation IC E and control unit D by means of opening or closing one or more of the above introduced switches 11, 21, 31, 41, 51, 61; 310, 320; 220, 230 and 331. The interactions between the elements within the detailed area A on the one hand and activation IC E and control unit D on the other hand are described in detail further below.

Concerning the charging procedure, firstly any particular piezoelectric element 10, 20, 30, 40, 50 or 60 which is to be charged has to be selected. In order to exclusively charge the first piezoelectric element 10, the branch selector switch 11 of the first branch 110 is closed, whereas all other branch selector switches 21, 31, 41, 51 and 61 remain opened. In order to exclusively charge any other piezoelectric element 20, 30, 40, 50, 60 or in order to charge several ones at the same time they would be selected by closing the corresponding branch selector switches 21, 31, 41, 51 and/or 61.

Then, the charging procedure may take place in the following manner.

Generally, within the example considered, the charging procedure requires a positive potential difference between capacitor 210 and the group selector piezoelectric terminal 14 of the first piezoelectric element 10. However, as long as charging switch 220 and discharging switch 230 are open no charging or discharging of piezoelectric element 10 occurs: In this state, the circuit shown in FIG. 4 is in a steady-state condition, i.e. piezoelectric element 10 retains its charge state in substantially unchanged fashion, and no current flows.

In order to charge the first piezoelectric element 10, charging switch 220 is closed. Theoretically, the first piezoelectric element 10 could become charged just by doing so. However, this would produce large currents which might damage the elements involved. Therefore, the occurring currents are measured at measuring point 620 and switch 220 is opened again as soon as the detected currents exceed a certain limit. Hence, in order to achieve any desired charge on the first piezoelectric element 10, charging switch 220 is repeatedly closed and opened whereas discharging switch 230 remains open.

In more detail, when charging switch 220 is closed, the conditions shown in FIG. 5a occur, i.e. a closed circuit comprising a series circuit made up of piezoelectric element 10, capacitor 210, and coil 240 is formed, in which a current $i_{LE}(t)$ flows as indicated by arrows in FIG. 5a. As a result of this current flow both positive charges are brought to the group selector piezoelectric terminal 14 of the first piezoelectric element 10 and energy is stored in coil 240.

When charging switch 220 opens shortly (for example, a few μs) after it has closed, the conditions shown in FIG. 5b occur: a closed circuit comprising a series circuit made up of piezoelectric element 10, charging diode 221, and coil 240 is formed, in which a current $i_{LA}(t)$ flows as indicated by arrows in FIG. 5b. The result of this current flow is that energy stored in coil 240 flows into piezoelectric element 10. Corresponding to the energy delivery to the piezoelectric element 10, the voltage occurring in the latter, and its external dimensions, increase. Once energy transport has taken place from coil 240 to piezoelectric element 10, the steady-state condition of the circuit, as shown in FIG. 4 and already described, is once again attained.

At that time, or earlier, or later (depending on the desired time profile of the charging operation), charging switch 220 is once again closed and opened again, so that the processes described above are repeated. As a result of the re-closing and re-opening of charging switch 220, the energy stored in piezoelectric element 10 increases (the energy already stored in the piezoelectric element 10 and the newly delivered energy are added together), and the voltage occurring at the piezoelectric element 10, and its external dimensions, accordingly increase.

If the aforementioned closing and opening of charging switch 220 are repeated numerous times, the voltage occurring at the piezoelectric element 10, and the expansion of the piezoelectric element 10, rise in steps.

Once charging switch 220 has closed and opened a predefined number of times, and/or once piezoelectric element 10 has reached the desired charge state, charging of the piezoelectric element is terminated by leaving charging switch 220 open.

Concerning the discharging procedure, in the example considered, the piezoelectric elements 10, 20, 30, 40, 50 and 60 are discharged in groups (G1 and/or G2) as follows:

Firstly, the group selector switch(es) 310 and/or 320 of the group or groups G1 and/or G2 the piezoelectric elements of which are to be discharged are closed (the branch selector switches 11, 21, 31, 41, 51, 61 do not affect the selection of piezoelectric elements 10, 20, 30, 40, 50, 60 for the discharging procedure, since in this case they are bypassed by the branch diodes 12, 22, 32, 42, 52 and 62). Hence, in order to discharge piezoelectric element 10 as a part of the first group G1, the first group selector switch 310 is closed.

Figure 5C:
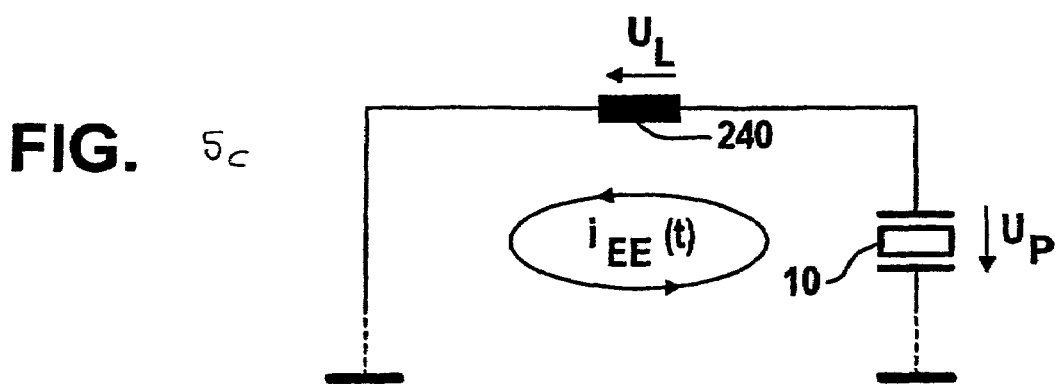
FIG. 5c shows a depiction to explain the conditions occurring during a first discharging phase (discharging switch 230 closed) in the circuit of FIG. 4.

When discharging switch 230 is closed, the conditions shown in FIG. 5c occur: a closed circuit comprising a series circuit made up of piezoelectric element 10 and coil 240 is formed, in which a current $i_{EE}(t)$ flows as indicated by arrows in FIG. 5c. The result of this current flow is that the energy (a portion thereof) stored in the piezoelectric element is transported into coil 240. Corresponding to the energy transfer from piezoelectric element 10 to coil 240, the voltage occurring at the piezoelectric element 10, and its external dimensions, decrease.

Figure 5D:
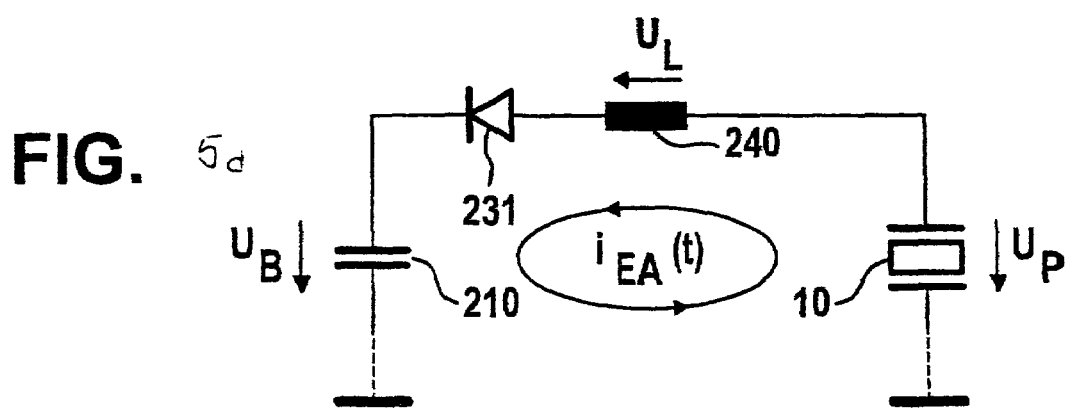
FIG. 5d shows a depiction to explain the conditions occurring during a second discharging phase (discharging switch 230 open again) in the circuit of FIG. 4.

When discharging switch 230 opens shortly (for example, a few μs) after it has closed, the conditions shown in FIG. 5d occur: a closed circuit comprising a series circuit made up of piezoelectric element 10, capacitor 210, discharging diode 231, and coil 240 is formed, in which a current $i_{EA}(t)$ flows as indicated by arrows in FIG. 5d. The result of this current flow is that energy stored in coil 240 is fed back into capacitor 210. Once energy transport has taken place from coil 240 to capacitor 210, the steady-state condition of the circuit, as shown in FIG. 4 and already described, is once again attained.

At that time, or earlier, or later (depending on the desired time profile of the discharging operation), discharging switch 230 is once again closed and opened again, so that the processes described above are repeated. As a result of the re-closing and re-opening of discharging switch 230, the energy stored in piezoelectric element 10 decreases further, and the voltage occurring at the piezoelectric element, and its external dimensions, also accordingly decrease.

If the aforementioned closing and opening of discharging switch 230 are repeated numerous times, the voltage occurring at the piezoelectric element 10, and the expansion of the piezoelectric element 10, decrease in steps.

Once discharging switch 230 has closed and opened a predefined number of times, and/or once the piezoelectric element has reached the desired discharge state, discharging of the piezoelectric element 10 is terminated by leaving discharging switch 230 open.

The interaction between activation IC E and control unit D on the one hand and the elements within the detailed area A on the other hand is performed by control signals sent from activation IC E to elements within the detailed area A via branch selector control lines 410, 420, 430, 440, 450, 460, group selector control lines 510, 520, stop switch control line 530, charging switch control line 540 and discharging switch control line 550 and control line 560. On the other hand, there are sensor signals obtained on measuring points 600, 610, 620, 630, 640, 650 within the detailed area A which are transmitted to activation IC E via sensor lines 700, 710, 720, 730, 740, 750.

The control lines are used to apply or not to apply voltages to the transistor bases in order to select piezoelectric elements 10, 20, 30, 40, 50 or 60, to perform charging or discharging procedures of single or several piezoelectric elements 10, 20, 30, 40, 50, 60 by means of opening and closing the corresponding switches as described above. The sensor signals are particularly used to determine the resulting voltage of the piezoelectric elements 10, 20 and 30, resp. 40, 50 and 60 from measuring points 600 resp. 610 and the charging and discharging currents from measuring point 62C. The control unit D and the activation IC E are used to combine both kinds of signals in order to perform an interaction of both as will be described in detail now while referring to FIGS. 4 and 6.

As is indicated in FIG. 4, the control unit D and the activation IC E are connected to each other by means of a parallel bus 840 and additionally by means of a serial bus 850. The parallel bus 840 is particularly used for fast transmission of control signals from control unit D to the activation IC E, whereas the serial bus 850 is used for slower data transfer.

Figure 6:
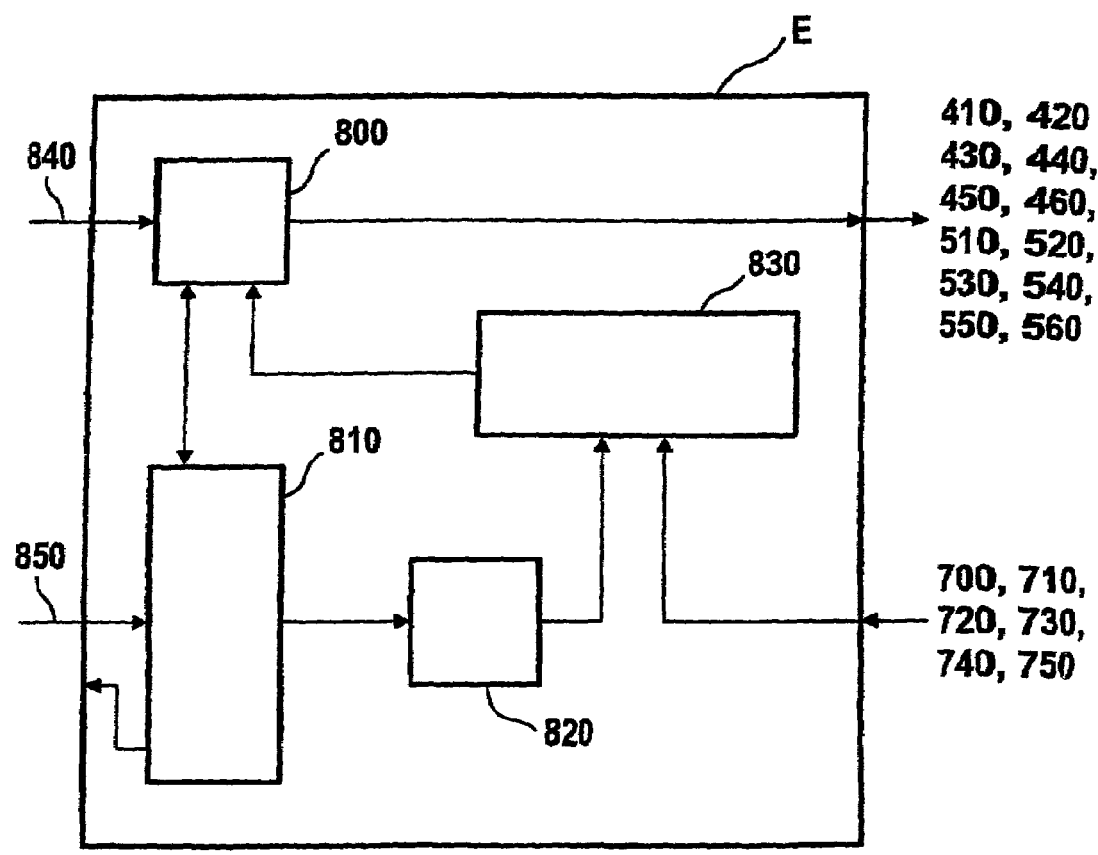
FIG. 6 shows a block diagram of components of the activation IC E which is also shown in FIG. 4.
Figure 7:
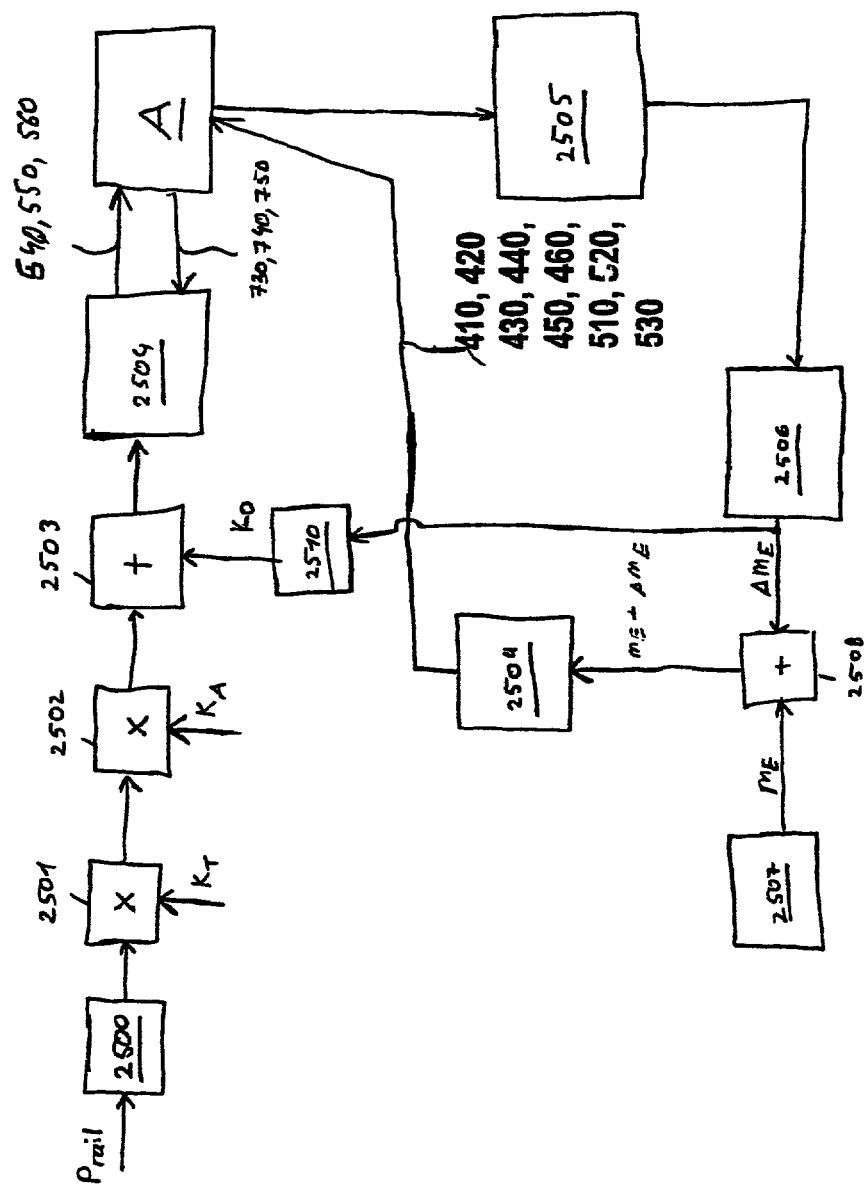

In FIG. 6 some components are indicated, which the activation IC E comprises: a logic circuit 800, RAM memory 810, digital to analog converter system 820 and comparator system 830. Furthermore, it is indicated that the fast parallel bus 840 (used for control signals) is connected to the logic circuit 800 of the activation IC E, whereas the slower serial bus 850 is connected to the RAM memory 810. The logic circuit 800 is connected to the RAM memory 810, to the comparator system 830 and to the signal lines 410, 420, 430, 440, 450 and 460; 510 and 520; 530; 540, 550 and 560. The RAM memory 810 is connected to the logic circuit 800 as well as to the digital to analog converter system 820. The digital to analog converter system 820 is further connected to the comparator system 830. The comparator system 830 is further connected to the sensor lines 700 and 710; 720; 730, 740 and 750 and—as already mentioned— to the logic circuit 800.

The above listed components may be used in a charging procedure for example as follows:

By means of the control unit D a particular piezoelectric element 10, 20, 30, 40, 50 or 60 is determined which is to be charged to a certain target voltage. Hence, firstly the value of the target voltage (expressed by a digital number) is transmitted to the RAM memory 810 via the slower serial bus 850. The target voltage can be, for example, the value for $U_{opt}$ used in a main injection, as described above with respect to FIG. 2. Later or simultaneously, a code corresponding to the particular piezoelectric element 10, 20, 30, 40, 50 or 60 which is to be selected and the address of the desired voltage within the RAM memory 810 is transmitted to the logic circuit 800 via the parallel bus 840. Later on, a strobe signal is sent to the logic circuit 800 via the parallel bus 840 which gives the start signal for the charging procedure.

The start signal firstly causes the logic circuit 800 to pick up the digital value of the target voltage from the RAM memory 810 and to put it on the digital to analog converter system 820 whereby at one analog exit of the converters 820 the desired voltage occurs. Moreover, said analog exit (not shown) is connected to the comparator system 830. In addition hereto, the logic circuit 800 selects either measuring point 600 (for any of the piezoelectric elements 10, 20 or 30 of the first group G1) or measuring point 610 (for any of the piezoelectric elements 40, 50 or 60 of the second group G2) to the comparator system 830. Resulting thereof, the target voltage and the present voltage at the selected piezoelectric element 10, 20, 30, 40, 50 or 60 are compared by the comparator system 830. The results of the comparison, i.e. the differences between the target voltage and the present voltage, are transmitted to the logic circuit 800. Thereby, the logic circuit 800 can stop the procedure as soon as the target voltage and the present voltage are equal to one another.

Secondly, the logic circuit 800 applies a control signal to the branch selector switch 11, 21, 31, 41, 51 or 61 which corresponds to any selected piezoelectric element 10, 20, 30, 40, 50 or 60 so that the switch becomes closed (all branch selector switches 11, 21, 31, 41, 51 and 61 are considered to be in an open state before the onset of the charging procedure within the example described). Then, the logic circuit 800 applies a control signal to the charging switch 220 so that the switch becomes closed. Furthermore, the logic circuit 800 starts (or continues) measuring any currents occurring on measuring point 620. Hereto, the measured currents are compared to any predefined maximum value by the comparator system 830. As soon as the predefined maximum value is achieved by the detected currents, the logic circuit 800 causes the charging switch 220 to open again.

Again, the remaining currents at measuring point 620 are detected and compared to any predefined minimum value. As soon as said predefined minimum value is achieved, the logic circuit 800 causes the charging switch 220 to close again and the procedure starts once again.

The closing and opening of the charging switch 220 is repeated as long as the detected voltage at measuring point 600 or 610 is below the target voltage. As soon as the target voltage is achieved, the logic circuit stops the continuation of the procedure.

The discharging procedure takes place in a corresponding way: Now the selection of the piezoelectric element 10, 20, 30, 40, 50 or 60 is obtained by means of the group selector switches 310 resp. 320, the discharging switch 230 instead of the charging switch 220 is opened and closed and a predefined minimum target voltage is to be achieved.

The timing of the charging and discharging operations and the holding of voltage levels in the piezoelectric elements 10, 20, 30, 40, 50 or 60, as for example, the time of a main injection, can be according to a valve stroke, as shown, for example, in FIG. 3.

It is to be understood that the above given description of the way charging or discharging procedures take place are exemplary only. Hence, any other procedure which utilizes the above described circuits or other circuits might match any desired purpose and any corresponding procedure may be used in place of the above described example.

FIG. 7 shows a configuration for controlling a combustion engine 2505. This configuration comprises a basic voltage calculation unit 2500 which calculates a basic voltage to be applied to the piezoelectric elements 10, 20, 30, 40, 50, and 60, of the circuit included in the detailed area A of FIG. 7; the detailed area A is also shown in FIG. 4. The basic voltage calculation unit 2500 calculates a basic voltage dependent on the pressure $P_{rail}$ in the pressurized fuel supply line of the fuel injection system. In a preferred embodiment, the basic voltage is corrected via a first correction block 2501 using a temperature correction value $K_T$. The output from the first correction block 2501 is a corrected basic voltage. This corrected basic voltage is preferably corrected by a second or subsequent correction block 2502 using an aging correction value $K_A$. The first and second correction blocks 2501 and 2502 are preferably multipliers, i.e., the basic voltage is multiplied by the temperature correction value $K_T$ and the output enters the second or subsequent correction block 2502 and is multiplied by the aging correction value $K_A$. The output of the second or subsequent correction block 2502 is preferably further corrected via a third or subsequent correction block 2503 using an online correction value $K_O$. The third or subsequent correction block 2503 is preferably implemented as an adder, i.e., the online correction value $K_O$ is preferably added to the output of the second or subsequent correction block 2502. The output of the third or subsequent correction block 2503 is preferably fed through a voltage and voltage gradient controller 2504.

The basic voltage calculation unit 2500, the correction blocks 2501, 2502, 2503, and the voltage and voltage gradient controller 2504 are software modules implemented in unit in D in FIG. 4.

Further, the voltage and voltage gradient controller 2504 is connected to activation IC E via serial bus 850. This activation IC E and the detailed area A are connected to each other by sensor lines 700, 710, 720, 730, 740, 750 and signal lines 410, 420, 430, 440, 450, 460 and 510, 520, 530, 540, 550, 560. The fuel injection into the combustion engine 2505 is controlled via the piezoelectric elements 10, 20, 30, 40, 50, and 60, of the circuit within the detailed area A shown in FIG. 4. The rotational speed of the combustion engine 2505 is measured and fed into a fuel correction unit 2506. The fuel correction unit 2506 comprises a frequency analyzer which evaluates the frequency of the rotational speed. The fuel correction unit 2506 calculates a fuel correction value $\Delta m_E$ upon this frequency analysis for each individual cylinder of the combustion engine 2505.

The configuration shown in FIG. 6 also comprises a fuel volume calculation unit 2507 calculating a desired fuel volume $m_E$. The desired fuel volume is added to the fuel volume correction value $\Delta m_E$ via an adder 2508. The sum of the desired fuel volume $m_E$ and the fuel volume correction value $\Delta m_E$ is fed into a fuel metering unit 2509. The fuel metering unit calculates the time a voltage has to be applied to the piezoelectric elements 10, 20, 30, 40, 50 and 60, to inject fuel into the combustion engine 2505 (how long and when). The fuel correction unit 2506, the adder 2508, the fuel volume calculation unit 2507 and the fuel metering unit are implemented in the control unit D. Time signals to signaling when a voltage has to be applied to the piezoelectric elements 10, 20 ,30, 40, 50 and 60, to inject fuel into the combustion engine 2505 are transferred to activation IC E via parallel bus 840.

The online correction value $K_O$ is calculated by an online optimization unit 2510. The online optimization unit 2510 calculates the online correction value $K_O$ based upon the fuel correction value $\Delta m_E$ calculated by the fuel correction unit 2506 for each individual cylinder.

To summarize, in FIG. 2, an optimal activation voltage is shown as corresponding to a maximal volume flow in a fixed time. In other words, when the valve is positioned exactly in the midway position between the two seats (i.e., between first closed position 2040 and second closed position 2030 in FIG. 1), the behavior of the whole injection element is optimized. In fact, if the performance of the piezoelectric element changes due to, for example, such factors as aging or manufacturing variations, the valve can not be positioned in an optimal position by using the aforementioned voltage.

Consequently, the voltage has to be adjusted to account for the changes in actuator behavior, especially its lift.

Moreover, the $U_{opt}$ value can also change due to variations in the layer thickness or number of layers (batch variations) in multi-layer piezoelectric elements. The adverse effect of batch variations is especially pronounced in small injections such as pre-injection stage. Therefore, in one embodiment of the invention, a compensation unit (e.g., 2502 in FIG. 7) can be devised to compensate for batch variations in the piezoelectric element's travel such that the fuel/air mixture is accurately dispensed. In other embodiments of the present invention, the control unit can assume this function.

In compensating for the above-identified variation in the travel is governed by equation (1) as follows:

$$h_{actual} = n_{actual} \cdot d_{33} \cdot U_{norm} \tag{1}$$

In equation (1), $n_{actual}$ is the number of layers of the multi-layer piezoelectric element; $d_{33}$ is the piezoelectric coefficient and $U_{norm}$ is the applied voltage before any correction; and $h_{actual}$ is the lifting distance traveled by the piezoelectric element and can be measured directly after the manufacturing of the piezoelectric element as one part of the manufacturing process. While it is possible to obtain a full range of data for the lifting ($h_{actual}$) as a function of voltage, it would require taking repetitive measurements which may be unnecessary. Accordingly, for this measurement only the lifting for the maximum voltage $U_{max}$ can be measured. That is, for this measurement only $U_{norm}$ would be equal to $U_{max}$. For all other applications $U_{norm}$ is considered to be the voltage which is applied to an ideal piezoelectric element as a target voltage for a certain lift without taking into account any correction values.

Equation (1) yields the voltage correction factor K for the voltage as follows:

$$K = h_{norm}/h_{actual} \tag{2}$$

In equation (2) $h_{norm}$ represents the piezoelectric element's standard travel at a given voltage. This value represents the expected travel of the piezoelectric element at a given voltage.

Therefore, the following holds for voltage U which compensates for the fluctuations in the number of layers or differences in the piezoelectric coefficient $d_{33}$:

$$U = f_1(K) \cdot U_{norm} \tag{3}$$

Similarly, in compensating for fluctuations in the layer thickness a corrected charge value (Q) is determined in the following manner.

$$h_{actual} = d_{actual} \cdot (1/A) \cdot (d_{33}/\epsilon_{33} \cdot \epsilon_0) \cdot Q_{norm} \tag{4}$$

Equation (4) holds for the measured start value of the travel where, $d_{actual}$ is the existing averaged-layer thickness; $Q_{norm}$ is the sum of the charges that would be brought on an ideal piezoelectric element for a certain action in the absence of interference from manufacturing or any other anomaly; A is the effective area of the multi-layer actuator and $\epsilon_{33}$ is the dielectric coefficient. $\epsilon_0$ is the dielectric coefficient of an ideal piezoelectric element.

So, $h_{actual}$ is a linear function of Q also.

Equation (4) yields charge correction factor $K_Q = K$ in a similar fashion as equation (2):

$$K = h_{norm}/h_{actual} \tag{5}$$

Finally, the following holds for charge Q which compensates for the fluctuation in the layer thickness:

$$Q = f_2(K) \cdot Q_{norm} \tag{6}$$

Therefore, in one embodiment of the present invention, the same correction factor can be used, whether the actuator is going to be charged with a certain voltage or a certain charge.

Preferably, the measured correction factor is measured for each individual actuator and stored in the control unit. For example, this can be realized within an EEPROM in the control unit. As embodied herein, the respective correction factors may be read from the EEPROM for test purposes.

What is claimed is:

1. An apparatus for charging a piezoelectric element (10, 20, 30, 40, 50 or 60), characterized in that an activation voltage and an activation charge value for driving the piezoelectric element (10, 20, 30, 40, 50 or 60) is controlled online by a control unit (D) which: (a) adjusts the activation voltage (U) and activation charge values in order to compensate for deviations caused by variations in the piezoelectric element's (10, 20, 30, 40, 50 or 60) layer thickness or the number of layers; and (b) determines the activation voltage and the activation charge value as a function of a correction factor, the correction factor measured in accordance with a manufacturing process.

2. The apparatus as defined in claim 1, characterized in that the piezoelectric element (10, 20, 30, 40, 50 or 60) is an actuator in a fuel injection system.

3. The apparatus of claim 1, characterized in that the control unit determines the activation voltage value and the activation charge values respectively as a function of the correction factor and the piezoelectric element's (10, 20, 30, 40, 50 or 60) normal voltage and normal charge.

4. The apparatus of claim 3, characterized in that the correction factor is a function of a piezoelectric element's (10, 20, 30, 40, 50 or 60) normal travel distance and the piezoelectric element's (10, 20, 30, 40, 50 or 60) respective actual travel distance.

5. The apparatus of claim 4, characterized in that the control unit determines the correction factor by dividing the piezoelectric element's (10, 20, 30, 40, 50 or 60) normal travel distance by the piezoelectric element's (10, 20, 30, 40, 50 or 60) respective actual travel distance.

6. The apparatus of claim 3, characterized in that the control unit (D) determines the correction factor as a function of temperature.

7. The apparatus of claim 5, characterized in that the normal travel distance and the respective actual travel distance are measured at substantially the same temperature.

8. A method for charging a piezoelectric element (10, 20, 30, 40, 50 or 60), characterized in that a definition is made, prior to charging, as to a value for an activation voltage (U) and a value for an activation charge of the piezoelectric element (10, 20, 30, 40, 50 or 60) to compensate for a deviation caused by a manufacturing variation of at least one of a layer thickness of the piezoelectric element (10, 20, 30, 40, 50 or 60) and a number of layers of the piezoelectric element (10, 20, 30, 40, 50 or 60), and the activation voltage and the activation charge value are determined as a function of a correction factor, the correction factor measured as part of a manufacturing process.

9. The method as defined in claim 8, characterized in that the piezoelectric element (10, 20, 30, 40, 50 or 60) is an actuator in a fuel injection system.

10. The method as defined in claim 8, characterized in that the activation voltage and the activation charge values respectively, are a function of the correction factor and the piezoelectric element's (10, 20, 30, 40, 50 or 60) normal voltage and the piezoelectric element's (10, 20, 30, 40, 50 or 60) normal charge.

11. The method as defined in claim 10, characterized in that the correction factor is a function of the piezoelectric element's (10, 20, 30, 40, 50 or 60) normal travel distance and the piezoelectric element's (10, 20, 30, 40, 50 or 60) respective actual travel distance.

12. The method as defined in claim 11, characterized in that a control unit (D) determines that correction factor by dividing the piezoelectric element's (10, 20, 30, 40, 50 or 60) normal travel distance to the piezoelectric element's (10, 20, 30, 40, 50 or 60) respective actual travel distance.

13. The method as defined in claim 10, characterized in that the control unit determines the correction factor as a function of temperature.

14. The method as defined in claim 13, characterized in that the normal travel distance and the respective actual travel distance are measured at substantially the same temperature.

15. The method as defined in claim 10, characterized in that the correction factor is stored for each cylinder within an EEPROM of the control unit (D).

16. The method as defined in claim 15, characterized in that the correction factor can be read from the EEPROM for test purposes.

17. An apparatus for charging a piezoelectric element, comprising:
a control unit configured to control an activation voltage and an activation charge value to drive the piezoelectric element;
wherein the control unit is configured to adjust the activation voltage and activation charge value to compensate for a deviation caused by a manufacturing variation of at least one of a layer thickness of the piezoelectric element and a number of layers of the piezoelectric element; and
wherein the control unit is configured to determine the activation voltage and the activation charge value as a function of a correction factor, the correction factor measured in accordance with a manufacturing process.

18. The apparatus according to claim 17, wherein the piezoelectric element includes an actuator in a fuel injection system.

19. The apparatus according to claim 17, wherein the control unit is configured to determine the activation voltage and the activation charge value as a function of the correction factor and at least one of a normal voltage and a normal charge.

20. The apparatus according to claim 19, wherein the correction factor is a function of a normal travel distance of the piezoelectric element and an actual travel distance of the piezoelectric element.

21. The apparatus according to claim 20, wherein the control unit is configured to determine the correction factor in accordance with a division of the normal travel distance by the actual travel distance.

22. The apparatus according to claim 19, wherein the control unit is configured to determine the correction factor as a function of temperature.

23. The apparatus according to claim 21, further comprising an arrangement configured to measure the normal travel distance and the actual travel distance at substantially a same temperature.

24. A method for charging a piezoelectric element, comprising the steps of:
defining, prior to charging, a value for an activation voltage and a value for an activation charge of the piezoelectric element to compensate for a deviation caused by a manufacturing variation of at least one of a layer thickness of the piezoelectric element and a number of layers of the piezoelectric element; and
determining the activation voltage and the activation charge value as a function of a correction factor, the correction factor determined in accordance with a manufacturing process.

25. The method according to claim 24, wherein the piezoelectric element includes an actuator in a fuel injection system.

26. The method according to claim 24, wherein the activation voltage and the activation charge are a function of a normal voltage, a normal charge and the correction factor.

27. The method according to claim 26, wherein the correction factor is a function of a normal travel distance of the piezoelectric element and an actual travel distance of the piezoelectric element.

28. The method according to claim 27, further comprising the step of determining the correction factor by a control unit by dividing the normal travel distance by the actual travel distance.

29. The method according to claim 26, further comprising the step of determining the correction factor by a control unit as a function of temperature.

30. The method according to claim 29, further comprising the step of measuring a normal travel distance of the piezoelectric element and an actual travel distance of the piezoelectric element at substantially a same temperature.

31. The method according to claim 26, further comprising the step of measuring the correction factor as a part of the manufacturing process.

32. The method according to claim 26, further comprising the step of storing the correction factor for each cylinder within an EEPROM of a control unit.

33. The method according to claim 32, further comprising the step of reading the correction factor from the EEPROM for test purposes.

* * * * *